United States Patent
Peterson et al.

(10) Patent No.: US 11,443,240 B2
(45) Date of Patent: Sep. 13, 2022

(54) PRIVACY PRESERVING COLLABORATIVE LEARNING WITH DOMAIN ADAPTATION

(71) Applicant: Oracle International Corporation, Redwood Shores, CA (US)

(72) Inventors: Daniel Peterson, Somerville, MA (US); Pallika Haridas Kanani, Westford, MA (US); Virendra J. Marathe, Nashua, NH (US)

(73) Assignee: Oracle International Corporation, Redwood Shores, CA (US)

( * ) Notice: Subject to any disclaimer, the term of this patent is extended or adjusted under 35 U.S.C. 154(b) by 366 days.

(21) Appl. No.: 16/829,433

(22) Filed: Mar. 25, 2020

(65) Prior Publication Data

US 2021/0073677 A1 Mar. 11, 2021

Related U.S. Application Data

(60) Provisional application No. 62/896,742, filed on Sep. 6, 2019.

(51) Int. Cl.
*G06N 20/00* (2019.01)
*G06N 3/04* (2006.01)
(Continued)

(52) U.S. Cl.
CPC ......... *G06N 20/00* (2019.01); *G06F 21/6254* (2013.01); *G06N 3/04* (2013.01)

(58) Field of Classification Search
CPC ....... G06N 20/00; G06N 3/04; G06F 21/6254
See application file for complete search history.

(56) References Cited

U.S. PATENT DOCUMENTS 10,320,752 B2 * 6/2019 Hardy ................. G06F 21/6254
10,402,469 B2 * 9/2019 McMahan ............... G06F 17/17
(Continued)

FOREIGN PATENT DOCUMENTS

WO WO-2016061628 A1 * 4/2016 ........... G06F 16/285

OTHER PUBLICATIONS

Dimitrakakis et al., "Differential Privacy for Bayesian Inference through Posterior Sampling", Journal of Machine Learning Research, dated Mar. 2017, 39 pages.
(Continued)

*Primary Examiner* — Darshan I Dhruv
(74) *Attorney, Agent, or Firm* — Hickman Becker Bingham Ledesma LLP; Brian N. Miller

(57) ABSTRACT

Herein are techniques for domain adaptation of a machine learning (ML) model. These techniques impose differential privacy onto federated learning by the ML model. In an embodiment, each of many client devices receive, from a server, coefficients of a general ML model. For respective new data point(s), each client device operates as follows. Based on the new data point(s), a respective private ML model is trained. Based on the new data point(s), respective gradients are calculated for the coefficients of the general ML model. Random noise is added to the gradients to generate respective noisy gradients. A combined inference may be generated based on: the private ML model, the general ML model, and one of the new data point(s). The noisy gradients are sent to the server. The server adjusts the general ML model based on the noisy gradients from the client devices. This client/server process may be repeated indefinitely.

16 Claims, 6 Drawing Sheets

(51) Int. Cl.
G06F 21/62 (2013.01)
G06F 15/18 (2006.01)

(56) References Cited

U.S. PATENT DOCUMENTS

| | | | | |
|---|---|---|---|---|
| 10,438,129 | B1* | 10/2019 | Singer | G06N 20/00 |
| 10,922,556 | B2* | 2/2021 | Dreyfuss | G06N 3/0454 |
| 11,010,637 | B2* | 5/2021 | Visentini Scarzanella | G06V 10/82 |
| 2015/0324686 | A1* | 11/2015 | Julian | G06N 3/08 706/25 |
| 2019/0073608 | A1* | 3/2019 | Veeningen | G06N 20/00 |
| 2019/0227980 | A1* | 7/2019 | McMahan | G06N 3/0445 |
| 2019/0238516 | A1* | 8/2019 | Weggenmann | G06F 21/6254 |
| 2020/0034197 | A1* | 1/2020 | Nagpal | G06F 9/50 |
| 2020/0104705 | A1* | 4/2020 | Bhowmick | G06N 3/04 |
| 2020/0234082 | A1* | 7/2020 | Toda | G06K 9/6257 |
| 2020/0242466 | A1* | 7/2020 | Mohassel | H04L 9/008 |
| 2020/0366459 | A1* | 11/2020 | Nandakumar | G06F 21/6245 |
| 2020/0394320 | A1* | 12/2020 | Bernau | G06F 21/6254 |
| 2021/0166157 | A1* | 6/2021 | Bhowmick | G06N 20/20 |
| 2021/0409197 | A1* | 12/2021 | Baracaldo Angel | G06F 16/256 |

OTHER PUBLICATIONS

Guo et al., "Privacy-preserving Transfer Learning for Knowledge Sharing", dated Nov. 23, 2018, 8 pages.
Guo et al., "Multi-Source Domain Adaptation with Mixture of Experts", dated Oct. 16, 2018, 11 pages.
Geyer et al., "Differentially Private Federated Learning: A Client Level Perspective", 31st Conference on Neural Information Processing Systems (NIPS 2017), Long Beach, CA, USA, dated 2017, 10 pages.
Gentry, Craig, "Fully Homomorphic Encryption Using Ideal Lattices", STOC'09, May 31-Jun. 2, 2009, Bethesda, Maryland, USA, 10 pages.
French et al., "Self-ensembling for Visual Domain Adaptation" dated Feb. 21, 2018, 20 pages.
Fredrikson et al., "Privacy in Pharmacogenetics: An End-to-End Case Study of Personalized Warfarin Dosing", Proceedings of the 23rd USENIX Security Symposium, dated Aug. 2014, 17 pages.
Fredrikson et al, "Model Inversion Attacks that Exploit Confidence Information and Basic Countermeasures", CCS'15, Oct. 12-16, 2015, Denver, Colorado, USA, 12 pages.
Dwork, Cynthia, "Differential Privacy", dated 2006, 12 pages.
Abadi et al. "Deep Learning with Differential Privacy", e proceedings of the 23rd ACM Conference on Computer and Communications Security, dated Oct. 25, 2016, 14 pages.
Dwork et al., "Calibrating Noise to Sensitivity in Private Data Analysis", Springer-Verlag Berlin Heidelberg dated 2006, 20 pages.
Konecny et al., "Federated Optimization: Distributed Machine Learning for On-Device Intelligence", dated Oct. 8, 2016, 38 pages.
Daume III, Hal, "Frustratingly Easy Domain Adaptation", dated 2009, 8 pages.
Daume III, Hal, "Domain Adaptation for Statistical Classifiers", Journal of Artificial Intelligence Research 26, dated May 2006, 26 pages.
Crammer et al., "Learning from Multiple Sources", Journal of Machine Learning Research 9, dated Aug. 2008, 18 pages.
Chaudhuri et al., "Differentially Private Machine Learning", Theory, Algorithms, and Applications, US San Diego, dated Dec. 4, 2017, 130 pages.
Chaudhuri et al., "Differentially Private Empirical Risk Minimization", Journal of Machine Learning Research 12, dated 2011, 41 pages.
Papernot et al., "Scalable Private Learning With Pate", Published as a conference paper, dated 2018, 34 pages.
Bonawitz et al., "Towards Federated Learning at Scale: System Design", Proceedings of the 2nd SysML Conference, Palo Alto, CA, dated Mar. 22, 2019, 15 pages.
Bickel, Steffen, "ECML-PKDD Discovery Challenge 2006 Overview", dated Sep. 18, 2006, 9 pages.
Ben-David et al., "A Theory of Learning from Different Domains" Published online dated Oct. 23, 2009, 25 pages.
Dwork, Cynthia et al., "The Algorithmic Foundations of Differential Privacy", Now Publishers, dated 2014, 26 pages.
Pan et al., "A Survey on Transfer Learning", IEEE, dated 2009, 15 pages.
Tu et al., "Dynamical Ensemble Learning with Model-Friendly Classifiers for Domain Adaptation", dated 2012, 4 pages.
Tramer et al., "Stealing Machine Learning Models via Prediction APIs", Proceedings of the 25th USENIX Security Symposium, dated Aug. 10, 2016, 19 pages.
Sun et al., "Bayesian Multi-Source Domain Adaptation", dated 2013, 5 pages.
Song et al., Stochastic Gradient Descent with Differentially Private Updates, IEEE, dated 2013, 4 pages.
Shokri et al., "Privacy-Preserving Deep Learning", CCS'15, Oct. 12-16, 2015, Denver, Colorado, USA, 12 pages.
Shokri et al., "Membership Inference Attacks Against Machine Learning Models", dated 2017, 16 pages.
Sarwate et al., "Signal Processing and Machine Learning with Differential Privacy: Algorithms and Challenges for Continuous Data", IEEE, dated Sep. 1, 2013, 17 pages.
Samdani et al., "Domain Adaptation with Ensemble of Feature Groups", Proceedings of the Twenty-Second International Joint Conference on Artificial Intelligence, dated 2011, 7 pages.
Rubinstein et al., "Learning in a Large Function Space: Privacy-Preserving Mechanisms for SVM Learning", Date: Oct. 23, 2018, 21 pages.
Hitaj et al., "Deep Models Under the GAN: Information Leakage from Collaborative Deep Learning", CCS'17, dated Oct. 30-Nov. 3, 2017, Dallas, TX, USA, 16 pages.
Park et al., "DP-EM: Differentially Private Expectation Maximization", dated Oct. 31, 2016, 9 pages.
Ji et al., "Learning Private Neural Language Modeling with Attentive Aggregation", dated Dec. 2018, 8 pages.
Nowland, "Evaluation of Adaptive Mixtures of Competing Experts", dated 1991, 7 pages.
Mironov, Iiya, "Renyi Differential Privacy", Google Brain dated Aug. 25, 2017, 13 pages.
McMahan et al., "Federated Learning of Deep Networks using Model Averaging", dated Feb. 17, 2016, 11 pages.
Masoudnia et al., "Mixture of Experts: a Literature Survey", Springer Science+Business Media B.V. dated May 12, 2012, 20 pages.
Liu et al., "Secure Federated Transfer Learning", dated Dec. 8, 2018, 9 pages.
Libert, Barry, "Leaders Need AI to Keep Pace With the Data Explosion", dated Mar. 26, 2019, 5 pages.
Kouw et al., "Technical Report an Introduction to Domain Adaptation and Transfer Learning", dated 2018.
Korolova, Aleksandra, "Privacy Violations Using Microtargeted Ads: A Case Study", Journal of Privacy and Confidentiality, dated 2011, 24 pages.
Yao, Andrew Chi-Chih, "How to Generate and Exchange Secrets", IEEE, dated 1986, 6 pages.
Park et al., "Private Topic Modeling", Privcy workshop (NIPS 2016), Barcelona, Spain, dated 2016, 8 pages.
Zhu et al., "The Anisotropic Noise in Stochastic Gradient Descent: Its Behavior of Escaping from Sharp Minima and Regularization Effects", https://www.researchgate.net/publication/323510216, dated Feb. 2018, 16 pages.
McMahan et al., "Learning Differentially Private Recurrent Language Modles", Sixth International Conference on Learning Representations, dated 2018, 14 pages.

* cited by examiner

FIG. 3

Ways of federated learning for general ML model 130A by central server 120...

302 Decrease respective weight when noisy gradient exceeds threshold

304 Calculate respective weight for set of noisy gradients from client device

306 Apply moments accountant technique

FIG. 4

Ways of domain adaptation and differential privacy by client device 111...

402 Based on gradient descent, adjusting bias of general ML model

404 Attenuate particular gradient when:
 o particular gradient exceeds first threshold, and/or
 o particular gradient changes by amount that exceeds second threshold 406 Based on gradient descent, tuning weighting for model averaging 408 Mixture of experts combines: first inference by private ML model, and second inference by general ML model

PRIVACY PRESERVING COLLABORATIVE LEARNING WITH DOMAIN ADAPTATION

BENEFIT CLAIM

This application claims the benefit of Provisional Application 62/896,742, filed Sep. 6, 2019, the entire contents of which is hereby incorporated by reference as if fully set forth herein, under 35 U.S.C. § 119(e).

FIELD OF THE INVENTION

The present invention relates to domain adaptation of a machine learning (ML) model. Herein are techniques to impose differential privacy onto federated learning by the ML model while maintaining prediction accuracy.

BACKGROUND

An explosion in data volume is being fueled by the ever growing online and mobile device activities of billions of users across the world. Digital connectivity has created highly attractive opportunities to leverage the massive volumes of data to significantly improve Machine Learning (ML) models to deliver more effective services to users. However, the sheer scale of the data generated is ill suited for centralization, such as with the traditional approach of moving large volumes of data to a datacenter that employs a large farm of central processing units (CPUs) and graphical processing units (GPUs) for model training and inference. Federated Learning (FL) accommodates this paradigm shift in data scale.

FL is a new distributed ML paradigm that enables multiple parties to jointly retrain a shared model, such that all parties contribute to and benefit from the large scale distributed retraining facilitated by FL. Despite its very recent introduction, FL has garnered significant traction in the research and practitioner communities.

The initial focus of FL has been on targeting millions of mobile devices, although the benefits of ML's architecture are apparent even for enterprise settings. Though the number of enterprise customers of an ML service are much smaller, each corporate customer or each customer premise may generate much more data than an individual mobile device.

Privacy preserving ML has been a topic of rapidly growing interest in the machine learning community for over a decade. Privacy research for ML has particularly been fueled by works demonstrating privacy attacks on systems and models that leak training data. These attacks might be extended to a FL setting as well.

FL does not guarantee data privacy, and there remains a more or less unmet need for modifications and additions of mechanisms to truly have privacy in FL. Existing techniques to enforce privacy in ML largely come from three different privacy enforcement classes: (i) differential privacy, (ii) multi-party computation, and (iii) homomorphic encryption. Most approaches, such as multi-party computation and homomorphic encryption, may be computationally infeasible on popular hardware.

Informally, differential privacy ensures privacy of training data by introducing "noise" in the training process (inputs, parameters, or outputs), in order to bound the variation in the output, to a predefined quantity ε (epsilon), based on inclusion/exclusion of a single data point from a given data set.

Epsilon-based data modification, as an arithmetic differential (i.e. distortion), leads to noise in output predicted by the model for each individual input data point. Such noise ensures ε-differential privacy for the data point, because a spy will not discover: which raw values were altered, how many raw values were altered, and what is the differential magnitude of a particular altered value.

The penalty for differential privacy is degraded accuracy of model predictions. In other words, privacy and (e.g. learning and/or prediction) accuracy may be antagonistic to each other. For example, when the participating parties provide data from diverse domains (e.g. including different environments, usages, habits, preferences), the added training noise of differential privacy can be impractical.

A market balance that favors accuracy over privacy may be disrupted as attacks evolve. Privacy attacks on ML models is an active research front. One particular point of focus in such work entails inferring details of features of training data points, also termed model inversion. Such work can be classified into two categories: (i) White box techniques that assume the adversary has access to the model architecture and can exploit it (e.g. a decision tree may unfortunately be somewhat intelligible to a spy), and (ii) Black box techniques that assume the model is bundled in an online ML service so the only way to leak training data information is through carefully crafted database query attacks.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

In the drawings:

FIG. 3 is a flow diagram that depicts example activities of federated learning for a general ML model by a server.

FIG. 4 is a flow diagram that depicts example activities of domain adaptation and differential privacy by a client device.

DETAILED DESCRIPTION

Figure 1:
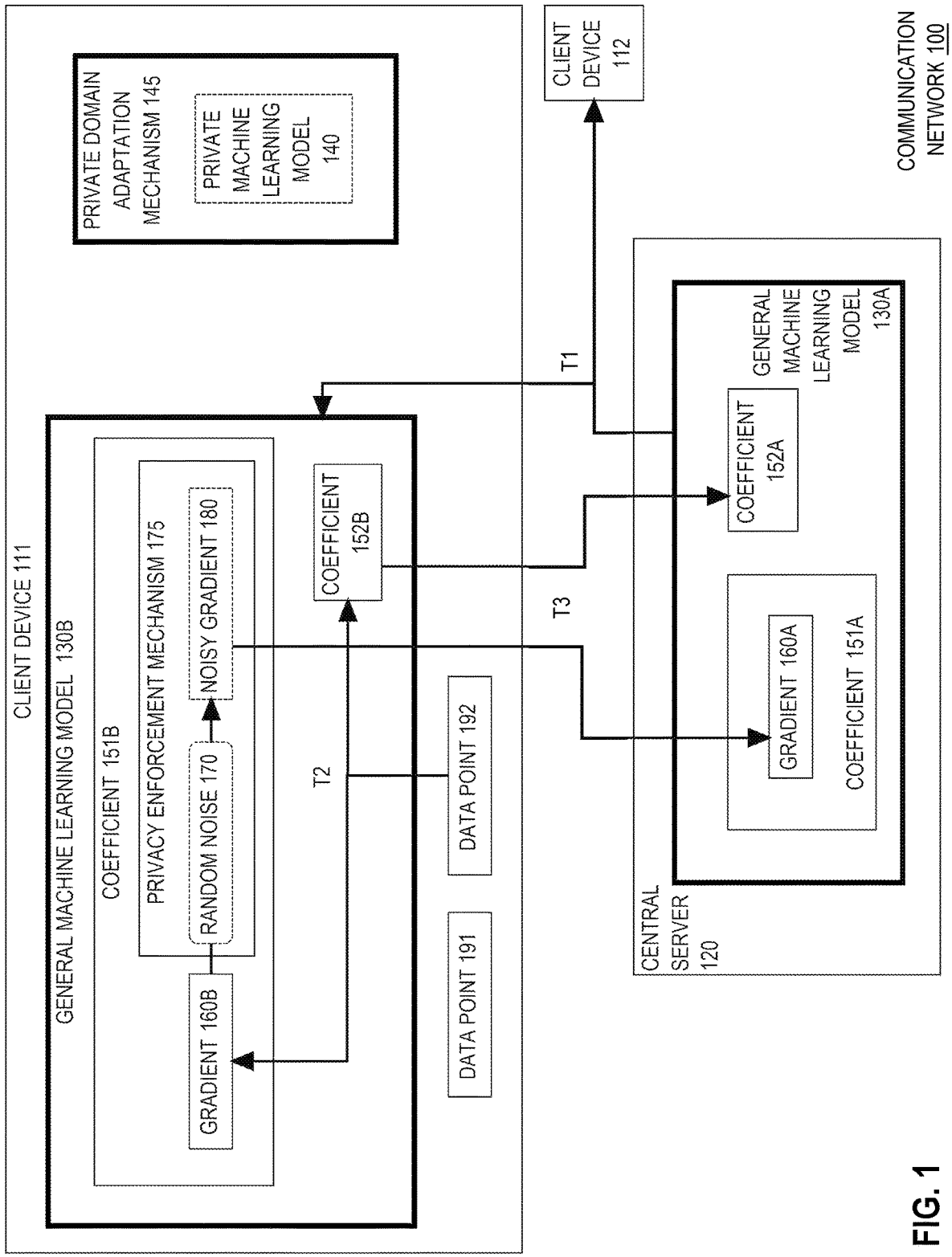
FIG. 1 is a block diagram that depicts an example communication network that contains many client devices that each hosts and trains its own two machine learning (ML) models: a private ML model, and a copy of a general ML model.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

GENERAL OVERVIEW

The sheer scale of usage data generated necessitates a truly distributed ML paradigm. In an embodiment, inference and training are shipped to the data. For example, multiple parties may contribute data, such that an embodiment may jointly re-train a shared model without sharing their data with any other parties.

Differential privacy is used herein as a mathematically quantifiable privacy guarantee for an algorithm that performs a computation on data sets. The privacy guarantee applies to each individual item in the data set and is formally specified in terms of a pair of data sets that differ in at most one item. Formally, consider an algorithm A such that A:D 1→R where D and R are respectively the domain and range of A. Two (e.g. training) data sets d and d' are adjacent if they differ from each other in exactly one data item. Algorithm A is ε-differentially private if the following condition holds true for all adjacent d and d' and any subset of outputs O ⊆ R: $P[A(d) \ EO] \leq e^{\varepsilon} P[A(d') E \ O]$ In other words, c represents the upper bound for variance between the probabilities with which A generates an output from O. That effectively introduces a "correction" in algorithm A to ensure that the differential privacy bound holds for any two adjacent inputs. That correction is commonly referred to as noise introduced in the algorithm, its input, or output to ensure that the ε-differential privacy bound holds. A further relaxation of the bounds is introduced by (ε, δ)-differential privacy that ensures that the ε-differential privacy bound holds with the probability δ. Mathematically, it is expressed as $P[A(d) \ E \ O] \leq e^{\varepsilon} P[A(d') \ E \ O] + \delta$ In an embodiment, federated learning (FL) enables collaborative retraining of a model between multiple parties, such as users of mobile devices. In FL, each user's model is modified by re-training on premise using the party's private data to generate modified gradients. The modified gradients are then shipped back from each user device to a single general model. A central server periodically aggregates the gradients it receives from many parties, and applies them to the general model. The updated general model's aggregated gradients are then pushed (i.e. published) back to all the parties, which subsequently replace their locally retrained models with the retrained general model. That cycle keeps repeating throughout the lifetime of the distributed model.

Proposed herein are novel domain adaptation techniques. Rather than training one model that learns both a general task and domain-specific adaptations, techniques herein learn a general model with private collaboration and separately learn domain-specific adaptations for each user in a distributed fashion.

Techniques herein implement domain adaptation as a mixture of experts, where each user's device learns a domain-specific expert model, and then makes its final prediction using a mixture of its domain-specific expert and the collaborative, general model. Techniques herein learn mixture weights as a gating mechanism with an attention mechanism as explained later herein.

No prior work combines secure collaborative learning with private domain adaptation. It is unclear if FL without domain adaptation capabilities can adapt to data sets from different domains. Furthermore, addition of differential privacy in FL introduces more noise in prediction accuracy of the model used in the FL framework. Techniques herein address that gap by introducing domain adaptation in differentially private FL.

With techniques herein, adding private, per-user domain adaptation to a collaborative model-building framework increases accuracy for all users, and is especially beneficial when privacy guarantees begin to diminish the utility of the collaborative general model.

In an embodiment, domain adaptation trains the entire model with gradient descent, which works well in practice on both regression and classification tasks. Embodiments that include domain adaptation according to techniques herein achieve more accuracy than federated learning (FL) by itself. Such increased accuracy over mere FL occurs even when stronger data privacy (and a corresponding increase in gradient noise) is imposed. For example, when accuracy is significantly degraded by differential privacy, the domain adaption techniques herein are still more accurate than mere FL. Thus, techniques herein are more robust and provide more privacy than existing ways.

In an embodiment, each of many client devices receive, from a server, coefficients of a general ML model. For respective new data point(s), each client device operates as follows. Based on the new data point(s), a respective private ML model is trained. Based on the new data point(s), respective gradients are calculated for the coefficients of the general ML model. In an embodiment, gradients are projected (i.e. clipped, attenuated) to a fixed maximum magnitude. Random noise is added to the gradients to generate respective noisy gradients. In an embodiment, the random noise is calibrated based on the maximum gradient magnitude. A combined inference may be generated based on: the private ML model, the general ML model, and one of the new data point(s).

The noisy gradients are sent to the server. The server adjusts the general ML model based on the noisy gradients from the client devices. This client/server process may be repeated indefinitely.

1.0 EXAMPLE COMMUNICATION NETWORK

FIG. 1 is a block diagram that depicts an example communication network 100, in an embodiment. Communication network 100 contains many client devices 111-112 that each hosts its own: a) copy of general ML model 130A such as 130B that the client device trains, and b) private domain adaptation mechanism such as 145. Example client devices 111-112 include smartphones, laptops, personal computers (PC), virtual machines (VM), and rack servers such as blades.

General ML models 130A-B may generalize, retain, and/or recognize patterns based on historic and/or exemplary data as explained later herein. For example, general ML model 130B may recognize a current usage context of a software application and predict or select an optimal automatic reaction to the current usage context by the software application. For example, the prediction or selection may be a suggestion to an end user such as keyboard entry type ahead or an online asset such as a song.

As explained later herein, general ML models 130A-B are generalized based on many end users and/or software applications. In other words, general ML model 130A may be configured to calculate a result such as an inference that is well suited to most but not all end users or software applications. For example, optimal inferences may be different for a novice user, an expert user, and an average user.

Thus, client devices 111-112 each have a same or different private domain adaptation mechanism such as 145 that provides a second inference for a same current usage context to override or combine with the inference by the general ML model of the client device as discussed later herein. In an embodiment, private domain adaption mechanism 145 may train, learn, and/or adapt based on actual usage at client device 111. In embodiments, operation, inferences, and/or implementation of private domain adaption mechanism 145 may be hidden from other devices such as other client devices and central server 120 as discussed later herein.

Some embodiments of private domain adaption mechanism 145 may or may not include private ML model 140 that is shown as a dashed box to indicate an implementation choice that may or may not differ in client devices 111-112. When present, a private ML model may provide domain adaptation as follows and as discussed later herein.

The private ML model of client device 112 may use a same or different ML algorithm with same or different hyperparameters values as private ML model 140 of client device 111. For example, one private ML model may be a random forest, and the other private ML model may be a linear regressor. In another example, both private ML models are artificial neural networks (ANN) having different amounts of neurons and/or neural layers. In another example, both private models were initially identically configured ANNs that have since individuated (i.e. diverged) due to different respective training corpuses.

Communication network 100 uses federated learning to retrain a general ML model that has copies 130A-B whose divergence is more or less hidden by differential privacy. Herein, differential means a difference between a natural training corpus and a derived training corpus. Herein, the derived training corpus is different from the natural training corpus by the removal or addition of one sample (i.e. a data point such as 191-192). For example, a training corpus of 99 photographs may be differentially derived by removing one photo from a natural training corpus of 100 photos.

Private domain adaption mechanism 145 and/or private ML model 140 may be black box, such that their architecture may be more or less irrelevant to techniques herein. The architecture of general ML models 130A-B are somewhat more constrained: they should have a same architecture, and that architecture should have trainable coefficients, such as 151A-B and 152A-B. Example ML model architectures that have trainable coefficients include ANN, linear or logistic regression, and support vector machine (SVM).

Coefficients are numbers that are typically real numbers such as floating point or fixed point such as within a narrow normalized range such as 0 to 1 or −1 to +1. Some uncommon ML model architectures may instead use integer coefficients either naturally or for accelerated processing. Semantics of a particular coefficient may depend on the architecture of general ML models 130A-B. For example, a coefficient may be a weight such as for a particular connection in an ANN.

Coefficient training may have iterations for one or more training samples. Training error may be quantified and used to adjust the coefficients of an ML model. Accelerated optimization of coefficients during training may be based on gradients, such as 160A-B, that measure how much does a coefficient and/or the error change during one or more adjustments. For example, backpropagation while training an ANN entails gradient calculations.

Privacy enforcement mechanism 175 provides differential privacy herein. In an embodiment, privacy enforcement mechanism 175 adds random noise 170 to training gradient 160B to achieve differential privacy. Thus, a spy will not be able to recover noiseless gradient 160B, despite observing that gradient after noise is added (i.e. noisy gradient 180).

For example, client device 111 may keep general ML model 130B, including gradient 160B, strictly private, but share noisy gradient 180 with central server 120 to facilitate federated learning. Noisy gradient 180 may be used to adjust, although not outright replace, gradient 160A. Thus, coefficients 151A and 152A and their respective gradients may be influenced by noisy gradients received from client devices 111-112 to achieve federated learning.

Thus, general ML model 130A may learn from the training of general ML model 130B without central server 120 receiving private data points 191-192. Such training and sharing operations, and their timing according to time T1-T3, may be as follows. In any case, private ML model 140 maximizes accuracy by training without noise.

Some embodiments of privacy enforcement mechanism 175 may or may not include random noise 170 and noisy gradient 180 that are shown as a dashed box to indicate an implementation choice that may or may not differ in client devices 111-112. When random noise 170 and noisy gradient 180 are absent privacy enforcement mechanism 175 may instead provide differential privacy as follows. Instead of sending noisy gradients for coefficients to central server 120, privacy enforcement mechanism 175 may instead send gradients as calculated such as 160B without adding noise for some coefficients and not send gradients for some other coefficients.

In other words, privacy enforcement mechanism 175 may selectively withhold gradients of some coefficients. For example, privacy enforcement mechanism 175 may always withhold gradient 160B and always send gradients for some other coefficients. Likewise, privacy enforcement mechanism 175 may sometimes withhold gradient 160B and other times withhold gradients of some other coefficients instead. Client devices 111-112 may withhold gradients for same or different respective coefficients.

In embodiments, client devices 111 and/or 112 use round robin or random selection to choose a fixed or varying amount of gradients to withhold. In an embodiment, privacy enforcement mechanism 175 may: a) withhold one gradient and add noise to another gradient, and/or b) sometimes withhold a gradient, some other times add noise to the same gradient, and still other times send the gradient without withholding nor adding noise. In an embodiment, information leaked by such decisions should not exceed a privacy budget as discussed later herein.

2.0 EXAMPLE PROCESS FOR FEDERATED LEARNING WITH DIFFERENTIAL PRIVACY

Figure 2:
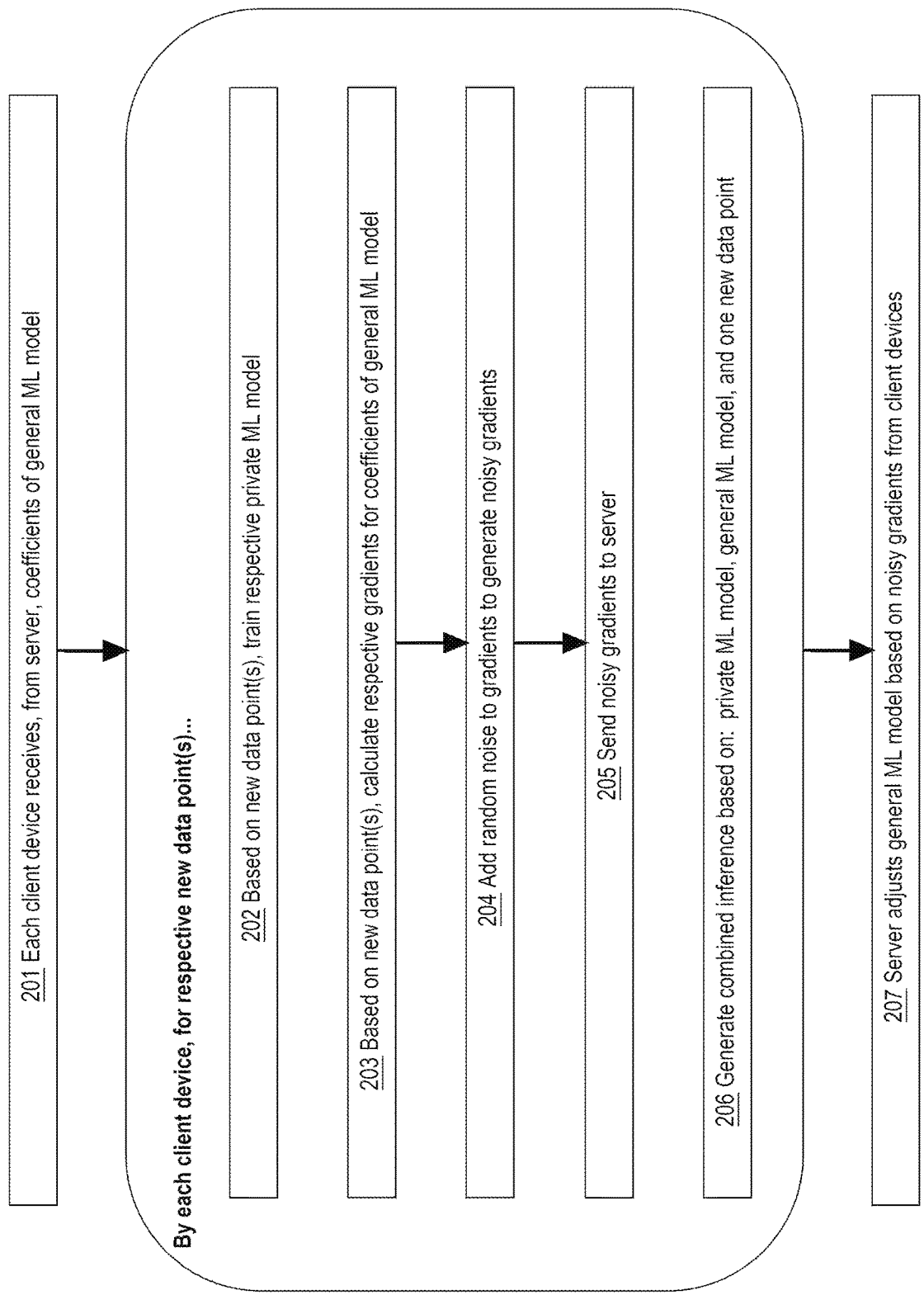
FIG. 2 is a flow diagram that depicts an example process in a communication network to train ML models based on federated learning and differential privacy.

FIG. 2 is a flow diagram that depicts an example process in communication network 100 to train ML models based on federated learning and differential privacy, in an embodiment. FIG. 2 is discussed with reference to FIG. 1. The process shown in FIG. 2 may be repeated. For example, federated learning may be an ongoing iterative activity for which FIG. 2 depicts one iteration. Thus, what is referred to herein as training need not be aboriginal training of an untrained ML model, and may typically be additional training or retraining of an already trained ML model. Thus, learning herein entails refinement.

Step 201 occurs at time T1. In step 201, each client device 111-112 receives, from central server 120, coefficients 151A and 152A of general ML model 130A. Coefficients are numbers, and transfer of coefficients may entail an array of numbers. So long as client device 111 has the architecture and hyperparameters of general ML model 130A locally deployed as general ML model 130B, client device 111 can more or less directly load coefficients 151A and 152A as coefficients 151B and 152B into general ML model 130B. In other words, transferring coefficients 151A and 152A achieves copying ML model 130A into ML model 130B. Thus, results of federated learning stored at central server 120 are disseminated to client devices 111-112.

In operation, each client device 111-112 captures respective one or more new data points 191-192 such as photographs. Each client device captures its own data points and does not share them. Data points are always kept private to the client device that captured them. In an embodiment, a data point is discarded when no longer needed.

Each client device 111-112 individually performs steps 202-206 when respective new data point(s) such as 191-192 are available at the client device. Client devices 111-112 individually operate. For example, client device 111 usually operates in service of an owner such as a person or enterprise and usually does not cooperate with other client devices.

In an embodiment, client devices 111-112 do not or cannot communicate with each other. For example, central server 120 may be the center of a star topology, and client devices 111-112 may be spokes in the topology, which may be implemented as a client/server architecture. In an embodiment, client devices 111-112 directly communicate to each other by peer to peer. For example, the implementation of central server 120 may be centralized in one client device or distributed amongst some or all client devices.

During operation, client device 111 captures data points 191-192, which may each be a user interaction, a logged event such as in a console logfile or database, or other observation such as a sensor observation such as a photograph. Some or all of steps 202-206 may be repeated for each individual data point such as 191. Likewise, some or all of steps 202-206 may occur once for some or all of data points 191-192 as a batch. Implementors have flexibility as to which of steps 202-206 are batched and which are not.

Based on new data point(s) such as 191-192, step 202 trains private ML model 140. Private ML model 140 provides domain adaptation to client device 111, which is based on local training with local data points to cause locally relevant learning. For example, client device 111 may be a smart phone or PC that may use private ML model 140 to learn preferences, characteristics, and/or habits of an end user. For example for a smart watch to classify a heart rate measurement as normal or abnormal may somewhat depend on training based on previous measurements made by that smart watch, which is suited for domain adaptation such as training for a particular end user and/or environment.

For example, client device 111 may be a network router that may use private ML model 140 to detect anomalous traffic based on training with previous network traffic experienced by the network router. For example, similar respective data points for client devices 111-112 may be anomalous to client device 111 but not 112. Thus, domain adaption based on private ML model 140 may provide flexibility needed to accommodate diverse environments and somewhat divergent usages. For example, domain adaption based on private ML model 140 may provide personalization.

Step 203 occurs at time T2. Based on new data point(s) such as 191-192, step 203 calculates gradients such as 160B for coefficients 151B and 152B, which may be part of training general ML model 130B. Thus, step 203 provides local training needed for federated learning in step 207 as explained below. Although domain adaption is primarily provided by step 202 with private ML model 140, step 203 with general ML model 130B provides some additional domain adaption, because both steps 202-203 entail local training with the same local data points 191-192. Thus, general ML model 130B may individuate somewhat away from general ML model 130A and away from the general ML model of client 112 that also is individuating.

Gradient calculation and internal use may depend on a spectrum of embodiments ranging from purely greedy to mostly random, with stochastic gradient descent (SGD) being a sweet spot between those two extremes. Greedy hill climbing tends to get trapped in a local optimum. Random walking has poor convergence, which is slow. SGD is more likely to actually find a global optimum within a feasible time, especially when many coefficients are involved.

SGD has evolved powerful computational mechanisms such as a parallelism and batching. If client device 111 has a multicore or hyperthreaded central processing unit (CPU), then symmetric multiprocessing (SMP) is available for inelastic horizontal scaling such as for SGD. In an embodiment, data points 191-192 constitute a training batch such as for SGD. A matrix mathematics and optimization library such as TensorFlow may be used for calculating coefficients and gradients, and/or applying SGD.

Federating learning relies on local training by client devices 111-112. Central server 120 facilitates federated learning by receiving what is learned by client devices 111-112, which risks privacy. As explained herein, differential privacy is introduced to preserve privacy, and differential privacy may entail random artificial noise.

The noise should be random to thwart reverse engineering by a spy. For example, non-random noise may have a detectable pattern, for which a spy may compensate. Step 204 adds random noise 170 to gradient 160B to generate noisy gradient 180.

For example, gradient 160B may have a value of negative 1.2; random noise 170 may have a value of positive 0.1, and by arithmetic addition, noisy gradient 180 may have a value of negative 1.1. When random noise 170 has such an attenuating impact on noisy gradient 180, then differential privacy is strengthened.

Constraints on noise such as range, statistical distribution, a privacy budget, and training impact and integration are discussed later herein. For example, training of general ML model 130B may naturally sense gradient 160B but instead use noisy gradient 180, which reduces the accuracy of general ML model 130B but increases differential privacy as follows.

Step 205 occurs at time T3. Step 205 sends noisy gradients such as 180 to central server 120, which may entail sending an array of noisy gradients. Because actual gradients such as 160B are never sent, differential privacy is maintained.

Steps 201 and 205 are different as follows. Step 201 transfers coefficients. Step 205 transfers noisy gradients. In step 201, client device 111 receives numbers from central server 120. In step 205, client device 111 sends numbers to central server 120.

Steps 203-205 are ordered as depicted with arrows. Steps 202 and 206 may be unordered and may overlap with each other and steps 203-205.

Step 206 is not part of training, learning, nor federated learning. Instead, step 206 inferences based on mediating between domain adaptation and federated learning, both of which already occurred during this iteration or previous iteration(s) of the process of FIG. 2. Unlike other steps of FIG. 2 that may be applied to one or more data points 191-192 as a batch, step 206 occurs for the individual local latest new data point.

Depending on the embodiment, if inferencing is unneeded for one or some new data points, then step 206 may sometimes be skipped. For example, client device 111 may be a smart watch that trains with all new data points, but is smart enough not to distract a car driver at speed with an unwanted inference. Thus, client device 111 may still contribute to federated learning even when inferencing is unwanted.

Step 206 generates a combined inference based on: private ML model 140, general ML model 130B, and one new data point 192. In an embodiment, step 206 performs model averaging of an inference by general ML model 130B and an inference by private ML model 140. Respective inferences by both ML models are averaged together because both ML models have separate special utility.

Private ML model 140 emphasizes domain adaption and is better at inferencing for a local data point that is peculiar to client device 111 such as an outlier. General ML model 130B is derived from general ML model 130A that has federated learning that is based on training corpuses of many client devices 111-112. Thus, general ML model 130B is better at inferencing for a typical/normal data point. Techniques for model averaging are presented later herein.

In step 207, central server 120 adjusts general ML model 130A based on noisy gradients sent from client devices 111-112 in step 205. As independent agents, the client device steps 202-206 may occur at different times for different client devices. Depending on the embodiment, even client device step 201 may occur at different times for different client devices, such as if client device 111 polls or schedules to pull coefficients 151A and 152B from central server 120. Pull frequency of different client devices may be different, or may be the same but out of phase.

Thus, central server 120 may receive noisy gradients from different client devices at different times. Central server 120 may buffer noisy gradients from multiple client devices until crossing a threshold. For example, each set of noisy gradients from a client device in step 205 may be stored in a separate buffer from a pool or in a queue.

The threshold condition may be: a) pool underflow, b) queue overflow, c) filling at least one buffer for each of a threshold amount of client devices, such as ten or all or half, or d) an elapsed fixed amount of time since step 207 previously occurred. If same client device 111 repeatedly sends updated noisy gradients before the threshold is crossed, each update set may be individually buffered and retained, or only the most recent one or few of those may be retained.

When the threshold is crossed, some client devices might not have sent any noisy gradients. For example, client device 111 may be a smartphone that lost wireless signal due to range or airplane mode, or may have no battery charge left, or may have not experienced any new data points. Thus, federated learning is robust and does not rely on continuous participation of any client device.

Step 207 occurs when the threshold is crossed. In an embodiment, step 207 occurs even if only one set of noisy gradients from only one client device is available. In an embodiment, step 207 is repeated for each individual set of noisy gradients received from any client device.

As discussed, step 207 performs federated learning, which may entail retraining, optimization, or other integration of noisy gradients from multiple client devices 111-112. Ways to centrally integrate these gradients are as follows.

3.0 EXAMPLE SERVER ACTIVITIES OF FEDERATED LEARNING

FIG. 3 is a diagram that depicts example activities of federated learning for general ML model 130A by central server 120, in an embodiment. FIG. 3 is discussed with reference to FIG. 1. The shown activities may occur in any ordering and/or concurrently occur. Some or all of the shown activities may be part of step 207 of FIG. 2.

There may be operational antagonism between domain adaptation and federated learning, which steps 302 and 304 can alleviate. For example: a) the local training corpus of data points of client device 111 may significantly diverge from those of other client devices, or b) a local data point of client device 111 may be an outlier. Thus, the noisy gradients of client device 111 could reduce the accuracy of general ML model 130A for most clients.

Thus, some client devices or some sets of noisy gradients may be less valuable than others for federated learning. The relative significance of a client device or a particular set of noisy gradients or a particular noisy gradient may be weighted by central server 120 to preserve training accuracy. Step 302 decreases a weight of a noisy gradient when the absolute value of the noisy gradient exceeds a threshold.

Step 304 calculates a respective weight for a set of noisy gradients from client device. For example, step 304 may increase the weight when the set of noisy gradients is similar to those of other client devices. Thus, an outlier noisy gradient or set of noisy gradients or a client device with repeatedly eccentric sets of noisy gradients may be attenuated or suppressed. Steps 302 and/or 304 may apply weighted or unweighted averaging of multiple values of a same noisy gradient from a same client device or from multiple client devices.

Step 306 applies moments accountant technique while integrating sets of noisy gradients from multiple client devices 111-112. Privacy loss is leakage of: a) the fact that a training corpus included a particular data point, b) a feature value of a data point such as a birthdate, or c) information such as gradient(s) from which (a) or (b) may be surmised.

Moments accountant very accurately calculates total privacy loss as a random variable. A random variable has a probability distribution that guarantees that a spy cannot surmise a data point with complete confidence. The noisier is a gradient, the less statistical confidence is afforded to the spy. When confidence is sufficiently low, model inversion is ineffective, and privacy is ensured.

With or without moments accountant, central server 120 may calculate privacy loss as a random variable based on moment-generating function(s) and/or probability density function(s) Moments accountant is useful as follows.

Moments accountant is passive and observes, but does not affect, accommodation of differential privacy by an underlying federated learning algorithm of central server 120. In an embodiment, moments accountant is diagnostic. In an embodiment, moments accountant provides quality assurance or privacy regulatory compliance such as for the Health Insurance Portability and Accountability Act (HIPAA).

4.0 EXAMPLE REGRESSOR TRAINING PROCESS

FIG. 4 is a diagram that depicts example activities of domain adaptation and differential privacy by client device 111, in an embodiment. FIG. 4 is discussed with reference to FIG. 1. The shown activities may occur in any ordering and/or concurrently occur.

An ANN has multiple hyperparameters, all of which are configurable. Bias is an important hyperparameter as follows. An ANN has an activation function that causes a neuron to act as a gate or switch, which decides whether or not the neuron conducts information to other neurons. The activation function can be influenced for all neurons in the ANN by introducing bias, which has the effect of globally adjusting the sensitivity of the ANN.

Configuring bias may be tedious, error prone, and may depend on which training corpus is used. Adjusting bias is an optimization problem. Based on gradient descent, step 402 adjusts the bias of general ML model 130B. Thus, bias is dynamically tuned during ongoing federated learning. Thus also, domain adaptation is applied to bias. In an embodiment, bias itself contributes a coefficient and gradient for transfer during federated learning.

As explained earlier herein, gradient attenuation may prevent outliers from reducing the accuracy of federated learning. However, gradient attenuation may also protect differential privacy by increasing anonymity of a data point. For example, general ML model 130B may train on demography of a small residential community. Without attenuation, a spy may easily detect whether or not a multibillionaire was recently added to the local training corpus of general ML model 130B, which might be a privacy violation. Step 404 attenuates gradient 160B or 180 when: the gradient exceeds a first threshold, and/or the gradient changes by an amount that exceeds a second threshold. Thus, an outlier may be introduced without arousing a spy. Likewise, medical anonymity may be protected for health records.

As explained earlier herein, step 206 of FIG. 2 may generate a combined inference by weighted averaging of a separate respective inference from each of ML models 130B and 140. Based on gradient descent, step 406 dynamically tunes that weighting for model averaging. For example, when inferencing an outlier data point, the relevance and weight of the inference of private ML model 140 should increase, and the weight of the inference of general ML model 130B should decrease. Thus, the relative importance of ML models 130B and 140 may dynamically shift based on a current data point.

There are sophisticated ways to weight or otherwise combine inferences. For example, the weight of the inference of central model 130B should be reduced when training accuracy on the local training corpus is low. For example, an environment or use or user preference for client device 111 may be somewhat unique.

Even more sophisticated combining of inferences is possible, such as with a mixture of experts (MOE) that performs a superset of step 406's operations of model averaging and/or gradient descent. In step 408, a MOE can specially combine: a first inference by private ML model 140, and a second inference by general ML model 130B. MOE is an attention mechanism that dynamically detects the relative relevance of the respective inferences of ML models 130B and 140.

When MOE is a form of ML ensemble that adds an inference combiner that is implemented as another ANN. In an embodiment, ML models 130B and 140 are both ANNs that conduct their respective inferences into a third ANN, the MOE. In an embodiment, the MOE is a separate kind of ANN In an embodiment, the MOE is the same kind of ANN as the other two, which more or less achieves a big ANN that contains the three constituent ANNs as respective subsets of layers of a big multilayer perceptron (MLP) as the big ANN. In any case, MOE makes inference combining highly trainable.

5.0 EXAMPLE FORMULAE

The following are example mathematical formulae 1-3 that may be incorporated into example embodiments presented earlier herein. Implementation of some or all of these formulae may entail a computer numerics library such as TensorFlow.

Differential privacy is a mathematically quantifiable privacy guarantee for an algorithm that performs a computation on data sets. The privacy guarantee applies to each individual item in the data set and is formally specified in terms of a pair of data sets that differ in at most one item. Formally, consider an algorithm A such that A:D $1 \rightarrow R_I$ where D and R are respectively the domain and range of A.

Two data sets d and $d^I$ differ from each other in exactly one data item. These data sets are adjacent. Algorithm A is ε-differentially private if the following condition holds true for all adjacent d and dl and any subset of outputs O ⊆R, per formula 1: $P[A(d)E\ O] \le e^{\varepsilon} P[A(d^I)EO]$ In other words, c represents the upper bound for variance between the probabilities with which A generates an output from O. This translates to introduction of a "correction" in algorithm A to ensure that the differential privacy bound holds for any two adjacent inputs. This correction is commonly referred to as the noise introduced in the algorithm, its input, or output to ensure that the ε-differential privacy bound holds. A further relaxation of the bounds is introduced by (ε, δ)-differential privacy that ensures that the ε-differential privacy bound holds with the probability δ. Mathematically, it is expressed as formula 2: $P[A(d)E\ O] \le e^{\varepsilon} P[A(d^I)E\ O]+\delta$ To make predictions, a weighted average of the outputs of the general and private models is computed. These weights are dynamically trained using a mixture of experts style attention mechanism.

More specifically, let $M_G$ be a general model, with parameters $\Theta_G$, so that $\hat{y}_G = M_G(X, \Theta_G)$ is the model's prediction for an input X. $M_G$ is shared between all parties, and is trained on all data using differentially private FL, thus enabling each party contribute to retraining of the general model. Differential privacy is added to $M_G$ using differentially private gradient descent based on the moments accountant technique.

Similarly, let $M_{Pi}$ be a private model of party i, parameterized by $\Theta_{pi}$, and $\hat{y}_{Pi} = M_{Pi}(x, \Theta_{Pi})$. Although $M_{Pi}$ could have a different architecture from $M_G$, this example initializes $M_{Pi}$ as an exact copy of $M_G$. Neither $M_{Pi}$, nor gradient information about it, is shared with any other party, so $M_{Pi}$ can be updated exactly, without including differential privacy related noise.

The final output that party i uses to label data is according to formula 3: $\hat{y}_i = \alpha M_G(x, \Theta_G) + (1-\alpha) M_{Pi}(x, \Theta_{Pi})$ In formula 3, the output $\hat{y}_i$ depends on weight α, which can be fixed. However, a dynamic, data-dependent weighting mechanism, α(x), can increase accuracy and privacy. Let the input for a particular example have a feature representation x, and let w be a learned set of weights. Let $\alpha(x)=o(w^T x + b)$, where o(x) is the sigmoid function. Thus the final output $\hat{y}_i$ depends on learned parameters $\Theta_G$, $\Theta_{Pi}$, w, and b, and all are updated via gradient descent.

On examples x where α is large, the gradient applied to $\Theta_G$ is large, and to $\Theta_{Pi}$ is small. On examples where α is small, the gradient applied to $\Theta_{Pi}$ is large, and to $\Theta_G$ is small. In effect, a learns the examples to trust the private model $M_{Pi}$ over the general model $M_G$ when α is small. These are exactly the examples that are unique to the domain of party i, and in this case the weighting mechanism increases the learning rate for the private model and decreases the learning rate of the general model. The more certain the model is that an example x differs from the support of $M_G$, the less information is leaked about that data point.

HARDWARE OVERVIEW

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
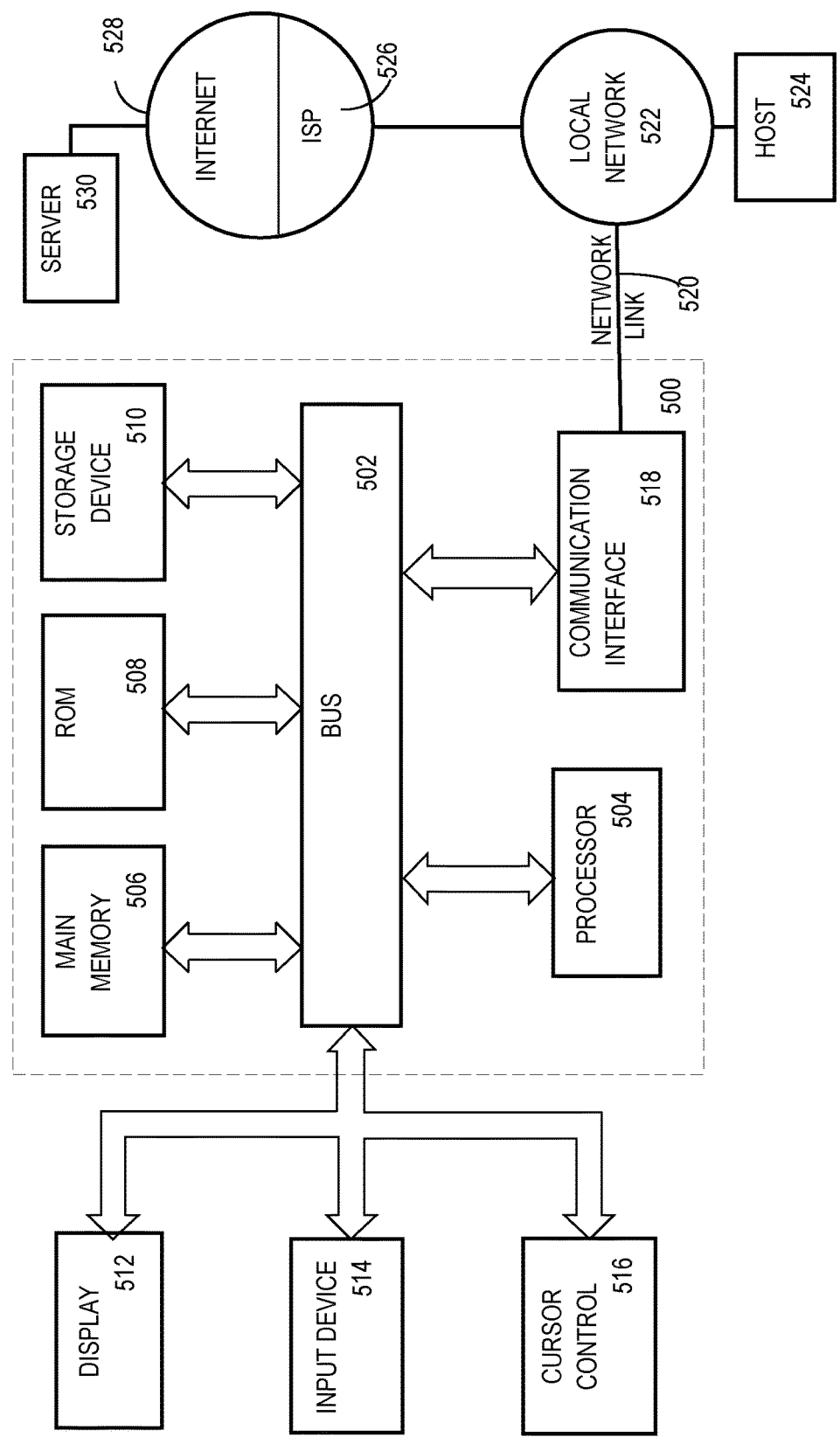
FIG. 5 is a block diagram that illustrates a computer system upon which an embodiment of the invention may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk, optical disk, or solid-state drive is provided and coupled to bus 502 for storing information and instructions.

Computer system 500 may be coupled via bus 502 to a display 512, such as a cathode ray tube (CRT), for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 510. Volatile media includes dynamic memory, such as main memory 506. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid-state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

SOFTWARE OVERVIEW

Figure 6:
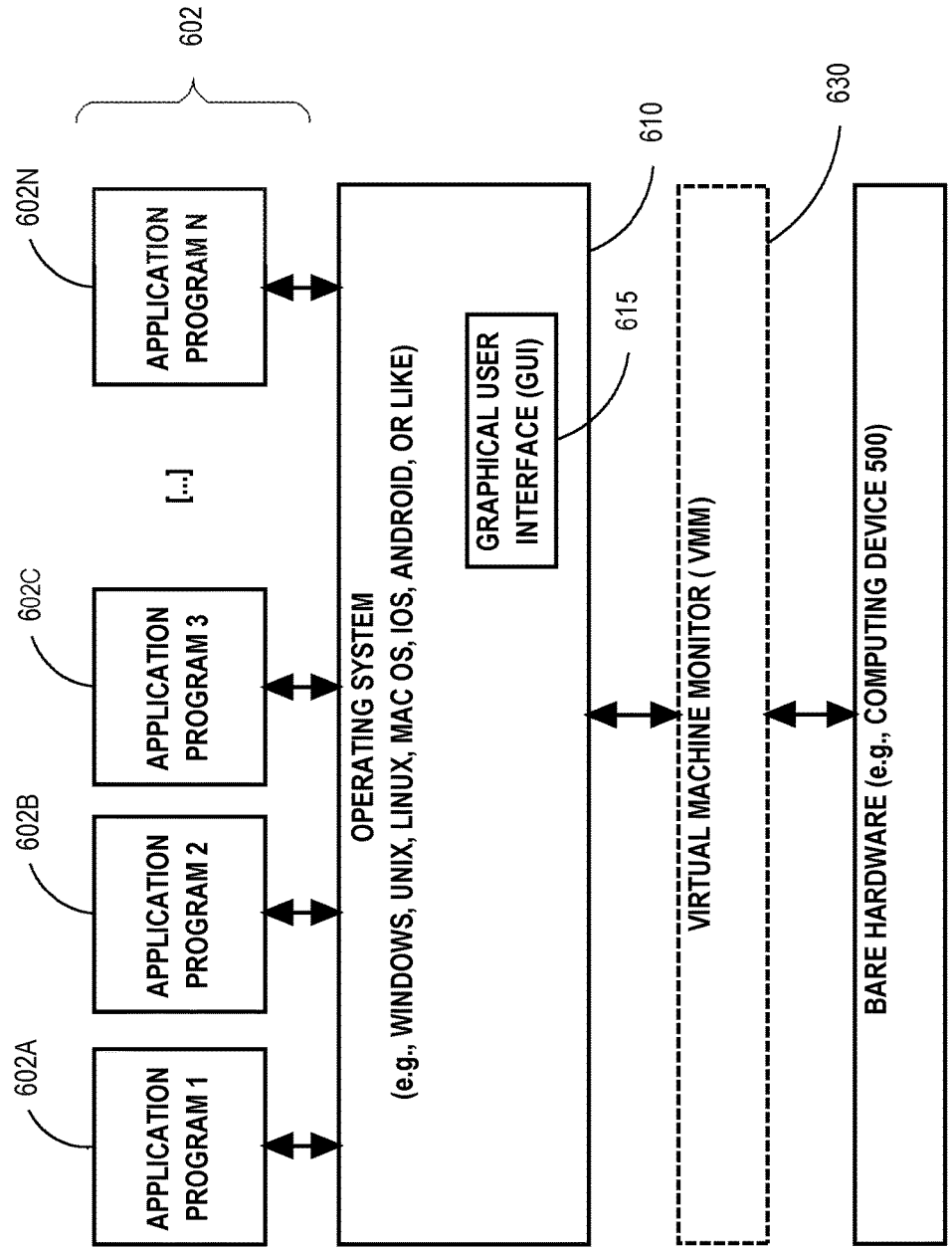
FIG. 6 is a block diagram that illustrates a basic software system that may be employed for controlling the operation of a computing system.

FIG. 6 is a block diagram of a basic software system 600 that may be employed for controlling the operation of computing system 500. Software system 600 and its components, including their connections, relationships, and functions, is meant to be exemplary only, and not meant to limit implementations of the example embodiment(s). Other software systems suitable for implementing the example embodiment(s) may have different components, including components with different connections, relationships, and functions.

Software system 600 is provided for directing the operation of computing system 500. Software system 600, which may be stored in system memory (RAM) 506 and on fixed storage (e.g., hard disk or flash memory) 510, includes a kernel or operating system (OS) 610.

The OS 610 manages low-level aspects of computer operation, including managing execution of processes, memory allocation, file input and output (I/O), and device I/O. One or more application programs, represented as 602A, 602B, 602C . . . 602N, may be "loaded" (e.g., transferred from fixed storage 510 into memory 506) for execution by the system 600. The applications or other software intended for use on computer system 500 may also be stored as a set of downloadable computer-executable instructions, for example, for downloading and installation from an Internet location (e.g., a Web server, an app store, or other online service).

Software system 600 includes a graphical user interface (GUI) 615, for receiving user commands and data in a graphical (e.g., "point-and-click" or "touch gesture") fashion. These inputs, in turn, may be acted upon by the system 600 in accordance with instructions from operating system 610 and/or application(s) 602. The GUI 615 also serves to display the results of operation from the OS 610 and application(s) 602, whereupon the user may supply additional inputs or terminate the session (e.g., log off).

OS 610 can execute directly on the bare hardware 620 (e.g., processor(s) 504) of computer system 500. Alternatively, a hypervisor or virtual machine monitor (VMM) 630 may be interposed between the bare hardware 620 and the OS 610. In this configuration, VMM 630 acts as a software "cushion" or virtualization layer between the OS 610 and the bare hardware 620 of the computer system 500.

VMM 630 instantiates and runs one or more virtual machine instances ("guest machines"). Each guest machine comprises a "guest" operating system, such as OS 610, and one or more applications, such as application(s) 602, designed to execute on the guest operating system. The VMM 630 presents the guest operating systems with a virtual operating platform and manages the execution of the guest operating systems.

In some instances, the VMM 630 may allow a guest operating system to run as if it is running on the bare hardware 620 of computer system 600 directly. In these instances, the same version of the guest operating system configured to execute on the bare hardware 620 directly may also execute on VMM 630 without modification or reconfiguration. In other words, VMM 630 may provide full hardware and CPU virtualization to a guest operating system in some instances.

In other instances, a guest operating system may be specially designed or configured to execute on VMM 630 for efficiency. In these instances, the guest operating system is "aware" that it executes on a virtual machine monitor. In other words, VMM 630 may provide para-virtualization to a guest operating system in some instances.

A computer system process comprises an allotment of hardware processor time, and an allotment of memory (physical and/or virtual), the allotment of memory being for storing instructions executed by the hardware processor, for storing data generated by the hardware processor executing the instructions, and/or for storing the hardware processor state (e.g. content of registers) between allotments of the hardware processor time when the computer system process is not running. Computer system processes run under the control of an operating system, and may run under the control of other programs being executed on the computer system.

CLOUD COMPUTING

The term "cloud computing" is generally used herein to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include: Software as a Service (SaaS), in which consumers use software applications that are running upon a cloud infrastructure, while a SaaS provider manages or controls the underlying cloud infrastructure and applications. Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment). Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer). Database as a Service (DBaaS) in which consumers use a database server or Database Management System that is running upon a cloud infrastructure, while a DbaaS provider manages or controls the underlying cloud infrastructure and applications.

The above-described basic computer hardware and software and cloud computing environment presented for purpose of illustrating the basic underlying computer components that may be employed for implementing the example embodiment(s). The example embodiment(s), however, are not necessarily limited to any particular computing environment or computing device configuration. Instead, the example embodiment(s) may be implemented in any type of system architecture or processing environment that one skilled in the art, in light of this disclosure, would understand as capable of supporting the features and functions of the example embodiment(s) presented herein.

MACHINE LEARNING MODELS

A machine learning model is trained using a particular machine learning algorithm. Once trained, input is applied to the machine learning model to make a prediction, which may also be referred to herein as a predicated output or output. Attributes of the input may be referred to as features and the values of the features may be referred to herein as feature values.

A machine learning model includes a model data representation or model artifact. A model artifact comprises parameters values, which may be referred to herein as theta values, and which are applied by a machine learning algorithm to the input to generate a predicted output. Training a machine learning model entails determining the theta values of the model artifact. The structure and organization of the theta values depends on the machine learning algorithm.

In supervised training, training data is used by a supervised training algorithm to train a machine learning model. The training data includes input and a "known" output. In an embodiment, the supervised training algorithm is an iterative procedure. In each iteration, the machine learning algorithm applies the model artifact and the input to generate a predicated output. An error or variance between the predicated output and the known output is calculated using an objective function. In effect, the output of the objective function indicates the accuracy of the machine learning model based on the particular state of the model artifact in the iteration. By applying an optimization algorithm based on the objective function, the theta values of the model artifact are adjusted. An example of an optimization algorithm is gradient descent. The iterations may be repeated until a desired accuracy is achieved or some other criteria is met.

In a software implementation, when a machine learning model is referred to as receiving an input, executed, and/or as generating an output or predication, a computer system process executing a machine learning algorithm applies the model artifact against the input to generate a predicted output. A computer system process executes a machine learning algorithm by executing software configured to cause execution of the algorithm.

Classes of problems that machine learning (ML) excels at include clustering, classification, regression, anomaly detection, prediction, and dimensionality reduction (i.e. simplification). Examples of machine learning algorithms include decision trees, support vector machines (SVM), Bayesian networks, stochastic algorithms such as genetic algorithms (GA), and connectionist topologies such as artificial neural networks (ANN). Implementations of machine learning may rely on matrices, symbolic models, and hierarchical and/or associative data structures. Parameterized (i.e. configurable) implementations of best of breed machine learning algorithms may be found in open source libraries such as Google's TensorFlow for Python and C++ or Georgia Institute of Technology's MLPack for C++. Shogun is an open source C++ ML library with adapters for several programing languages including C#, Ruby, Lua, Java, MatLab, R, and Python.

ARTIFICIAL NEURAL NETWORKS

An artificial neural network (ANN) is a machine learning model that at a high level models a system of neurons interconnected by directed edges. An overview of neural networks is described within the context of a layered feedforward neural network. Other types of neural networks share characteristics of neural networks described below.

In a layered feed forward network, such as a multilayer perceptron (MLP), each layer comprises a group of neurons. A layered neural network comprises an input layer, an output layer, and one or more intermediate layers referred to hidden layers.

Neurons in the input layer and output layer are referred to as input neurons and output neurons, respectively. A neuron in a hidden layer or output layer may be referred to herein as an activation neuron. An activation neuron is associated with an activation function. The input layer does not contain any activation neuron.

From each neuron in the input layer and a hidden layer, there may be one or more directed edges to an activation neuron in the subsequent hidden layer or output layer. Each edge is associated with a weight. An edge from a neuron to an activation neuron represents input from the neuron to the activation neuron, as adjusted by the weight.

For a given input to a neural network, each neuron in the neural network has an activation value. For an input neuron, the activation value is simply an input value for the input. For an activation neuron, the activation value is the output of the respective activation function of the activation neuron.

Each edge from a particular neuron to an activation neuron represents that the activation value of the particular neuron is an input to the activation neuron, that is, an input to the activation function of the activation neuron, as adjusted by the weight of the edge. Thus, an activation neuron in the subsequent layer represents that the particular neuron's activation value is an input to the activation neuron's activation function, as adjusted by the weight of the edge. An activation neuron can have multiple edges directed to the activation neuron, each edge representing that the activation value from the originating neuron, as adjusted by the weight of the edge, is an input to the activation function of the activation neuron.

Each activation neuron is associated with a bias. To generate the activation value of an activation neuron, the activation function of the neuron is applied to the weighted activation values and the bias.

ILLUSTRATIVE DATA STRUCTURES FOR NEURAL NETWORK

The artifact of a neural network may comprise matrices of weights and biases. Training a neural network may iteratively adjust the matrices of weights and biases.

For a layered feedforward network, as well as other types of neural networks, the artifact may comprise one or more matrices of edges W. A matrix W represents edges from a layer L-1 to a layer L. Given the number of neurons in layer L-1 and L is N[L-1] and N[L], respectively, the dimensions of matrix W is N[L-1] columns and N[L] rows.

Biases for a particular layer L may also be stored in matrix B having one column with N[L] rows.

The matrices W and B may be stored as a vector or an array in RAM memory, or comma separated set of values in memory. When an artifact is persisted in persistent storage, the matrices W and B may be stored as comma separated values, in compressed and/serialized form, or other suitable persistent form.

A particular input applied to a neural network comprises a value for each input neuron. The particular input may be stored as vector. Training data comprises multiple inputs, each being referred to as sample in a set of samples. Each sample includes a value for each input neuron. A sample may be stored as a vector of input values, while multiple samples may be stored as a matrix, each row in the matrix being a sample.

When an input is applied to a neural network, activation values are generated for the hidden layers and output layer. For each layer, the activation values for may be stored in one column of a matrix A having a row for every neuron in the layer. In a vectorized approach for training, activation values may be stored in a matrix, having a column for every sample in the training data.

Training a neural network requires storing and processing additional matrices. Optimization algorithms generate matrices of derivative values which are used to adjust matrices of weights W and biases B. Generating derivative values may use and require storing matrices of intermediate values generated when computing activation values for each layer.

The number of neurons and/or edges determines the size of matrices needed to implement a neural network. The smaller the number of neurons and edges in a neural network, the smaller matrices and amount of memory needed to store matrices. In addition, a smaller number of neurons and edges reduces the amount of computation needed to apply or train a neural network. Less neurons means less activation values need be computed, and/or less derivative values need be computed during training.

Properties of matrices used to implement a neural network correspond neurons and edges. A cell in a matrix W represents a particular edge from a neuron in layer L-1 to L. An activation neuron represents an activation function for the layer that includes the activation function. An activation neuron in layer L corresponds to a row of weights in a matrix W for the edges between layer L and L-1 and a column of weights in matrix W for edges between layer L and L+1. During execution of a neural network, a neuron also corresponds to one or more activation values stored in matrix A for the layer and generated by an activation function.

An ANN is amenable to vectorization for data parallelism, which may exploit vector hardware such as single instruction multiple data (SIMD), such as with a graphical processing unit (GPU). Matrix partitioning may achieve horizontal scaling such as with symmetric multiprocessing (SMP) such as with a multicore central processing unit (CPU) and or multiple coprocessors such as GPUs. Feed forward computation within an ANN may occur with one step per neural layer. Activation values in one layer are calculated based on weighted propagations of activation values of the previous layer, such that values are calculated for each subsequent layer in sequence, such as with respective iterations of a for loop. Layering imposes sequencing of calculations that is not parallelizable. Thus, network depth (i.e. amount of layers) may cause computational latency. Deep learning entails endowing a multilayer perceptron (MLP) with many layers. Each layer achieves data abstraction, with complicated (i.e. multidimensional as with several inputs) abstractions needing multiple layers that achieve cascaded processing. Reusable matrix based implementations of an ANN and matrix operations for feed forward processing are readily available and parallelizable in neural network libraries such as Google's TensorFlow for Python and C++, OpenNN for C++, and University of Copenhagen's fast artificial neural network (FANN). These libraries also provide model training algorithms such as backpropagation.

BACKPROPAGATION

An ANN's output may be more or less correct. For example, an ANN that recognizes letters may mistake an I as an L because those letters have similar features. Correct output may have particular value(s), while actual output may have somewhat different values. The arithmetic or geometric difference between correct and actual outputs may be measured as error according to a loss function, such that zero represents error free (i.e. completely accurate) behavior. For any edge in any layer, the difference between correct and actual outputs is a delta value.

Backpropagation entails distributing the error backward through the layers of the ANN in varying amounts to all of the connection edges within the ANN. Propagation of error causes adjustments to edge weights, which depends on the gradient of the error at each edge. Gradient of an edge is calculated by multiplying the edge's error delta times the activation value of the upstream neuron. When the gradient is negative, the greater the magnitude of error contributed to the network by an edge, the more the edge's weight should be reduced, which is negative reinforcement. When the gradient is positive, then positive reinforcement entails increasing the weight of an edge whose activation reduced the error. An edge weight is adjusted according to a percentage of the edge's gradient. The steeper is the gradient, the bigger is adjustment. Not all edge weights are adjusted by a same amount. As model training continues with additional input samples, the error of the ANN should decline. Training may cease when the error stabilizes (i.e. ceases to reduce) or vanishes beneath a threshold (i.e. approaches zero). Example mathematical formulae and techniques for feedforward multilayer perceptron (MLP), including matrix operations and backpropagation, are taught in related reference "EXACT CALCULATION OF THE HESSIAN MATRIX FOR THE MULTI-LAYER PERCEPTRON," by Christopher M. Bishop.

Model training may be supervised or unsupervised. For supervised training, the desired (i.e. correct) output is already known for each example in a training set. The training set is configured in advance by (e.g. a human expert) assigning a categorization label to each example. For example, the training set for optical character recognition may have blurry photographs of individual letters, and an expert may label each photo in advance according to which letter is shown. Error calculation and backpropagation occurs as explained above.

Unsupervised model training is more involved because desired outputs need to be discovered during training. Unsupervised training may be easier to adopt because a human expert is not needed to label training examples in advance. Thus, unsupervised training saves human labor. A natural way to achieve unsupervised training is with an autoencoder, which is a kind of ANN. An autoencoder functions as an encoder/decoder (codec) that has two sets of layers. The first set of layers encodes an input example into a condensed code that needs to be learned during model training. The second set of layers decodes the condensed code to regenerate the original input example. Both sets of layers are trained together as one combined ANN. Error is defined as the difference between the original input and the regenerated input as decoded. After sufficient training, the decoder outputs more or less exactly whatever is the original input.

An autoencoder relies on the condensed code as an intermediate format for each input example. It may be counter-intuitive that the intermediate condensed codes do not initially exist and instead emerge only through model training. Unsupervised training may achieve a vocabulary of intermediate encodings based on features and distinctions of unexpected relevance. For example, which examples and which labels are used during supervised training may depend on somewhat unscientific (e.g. anecdotal) or otherwise incomplete understanding of a problem space by a human expert. Whereas, unsupervised training discovers an apt intermediate vocabulary based more or less entirely on statistical tendencies that reliably converge upon optimality with sufficient training due to the internal feedback by regenerated decodings. Autoencoder implementation and integration techniques are taught in related U.S. patent application Ser. No. 14/558,700, entitled "AUTO-ENCODER ENHANCED SELF-DIAGNOSTIC COMPONENTS FOR MODEL MONITORING". That patent application elevates a supervised or unsupervised ANN model as a first class object that is amenable to management techniques such as monitoring and governance during model development such as during training.

RANDOM FOREST

A random forest or random decision forest is an ensemble of learning approaches that construct a collection of randomly generated nodes and decision trees during a training phase. Different decision trees of a forest are constructed to be each randomly restricted to only particular subsets of feature dimensions of the data set, such as with feature bootstrap aggregating (bagging). Therefore, the decision trees gain accuracy as the decision trees grow without being forced to over fit training data as would happen if the decision trees were forced to learn all feature dimensions of the data set. A prediction may be calculated based on a mean (or other integration such as soft max) of the predictions from the different decision trees.

Random forest hyper-parameters may include: number-of-trees-in-the-forest, maximum-number-of-features-considered-for-splitting-a-node, number-of-levels-in-each-decision-tree, minimum-number-of-data-points-on-a-leaf-node, method-for-sampling-data-points, etc.

In the foregoing specification, embodiments of the invention have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising iteratively:
receiving, by a client device and from a server, a plurality of coefficients of a general machine learning (ML) model;
for one or more new data points:
training, based on the one or more new data points, a private ML model,
calculating, based on the one or more new data points, a private plurality of gradients for the plurality of coefficients of the general ML model,
adding random noise to the private plurality of gradients to generate a plurality of noisy gradients,
sending the plurality of noisy gradients to the server, and
generating an inference based on: the general ML model, the private ML model, and one of the one or more new data points.

2. The method of claim 1 wherein:
said training the private ML model comprises tuning, based on a gradient descent or a bias term;
said generating the inference comprises:
generating a first inference by applying the private ML model to said one of the one or more new data points;
generating a second inference by applying the general ML model to said one of the one or more new data points;
combining the first inference and the second inference based on the bias term.

3. The method of claim 1 wherein the generating the inference comprises a mixture of experts combining: a first inference by the private ML model, and a second inference by the general ML model.

4. The method of claim 1 further comprising adjusting, by the server, the general ML model based on respective pluralities of noisy gradients from a plurality of client devices that includes the client device.

5. A method comprising iteratively:
receiving, by a client device and from a server, a plurality of coefficients of a general machine learning (ML) model;
for one or more new data points:
training, based on the one or more new data points, a private; ML model,
calculating, based on the one or more new data points, a private plurality of gradients for the plurality of coefficients of the general ML model,
applying a privacy enforcement mechanism to the private plurality of gradients to generate a transferable plurality of gradients,
sending the transferable plurality of gradients to the server, and generating an inference based on: the general ML model, the private ML model, and one of the one or more new data points;

calculating a respective weight for each transferable plurality of gradients of transferable pluralities of gradients respectively from a plurality of client devices that includes the client device;

applying said transferable pluralities of gradients to the general ML model based on the respective weights for said transferable pluralities of gradients.

6. The method of claim 5 wherein said calculating the respective weight for the transferable plurality of gradients from the client device comprises decreasing the respective weight when a gradient of the transferable plurality of gradients from the client device exceeds a threshold.

7. The method of claim 4 further comprising:
applying moments accountant technique, and/or
calculating privacy loss as a random variable based on moment-generating function(s).

8. One or more non-transitory computer-readable media storing instructions that, when executed by one or more processors, cause iteratively:

receiving, by a client device and from a server, a plurality of coefficients of a general machine learning (ML) model;

for one or more new data points:
training, based on the one or more new data points, a private; ML model,
calculating, based on the one or more new data points, a private plurality of gradients for the plurality of coefficients of the general ML model,
adding random noise to the private plurality of gradients to generate a plurality of noisy gradients,
sending the plurality of noisy gradients to the server, and
generating an inference based on: the general ML model, the private ML model, and one of the one or more new data points.

9. The one or more non-transitory computer-readable media of claim 8 wherein:
said training the private ML model comprises tuning, based on a gradient descent or a bias term;
said generating the inference comprises:
generating a first inference by applying the private ML model to said one of the one or more new data points;
generating a second inference by applying the general ML model to said one of the one or more new data points;
combining the first inference and the second inference based on the bias term.

10. The one or more non-transitory computer-readable media of claim 8 wherein the generating the inference comprises a mixture of experts combining: a first inference by the private ML model, and a second inference by the general ML model.

11. The one or more non-transitory computer-readable media of claim 8 wherein the instructions further cause adjusting, by the server, the general ML model based on respective pluralities of noisy gradients from a plurality of client devices that includes the client device.

12. One or more non-transitory computer-readable media storing instructions that, when executed by one or more processors, cause iteratively:

receiving, by a client device and from a server, a plurality of coefficients of a general machine learning (ML) model;

for one or more new data points:
training, based on the one or more new data points, a private; ML model,
calculating, based on the one or more new data points, a private plurality of gradients for the plurality of coefficients of the general ML model,
applying a privacy enforcement mechanism to the private plurality of gradients to generate a transferable plurality of gradients,
sending the transferable plurality of gradients to the server, and
generating an inference based on: the general ML model, the private ML model, and one of the one or more new data points;

calculating a respective weight for each transferable plurality of gradients of transferable pluralities of gradients respectively from a plurality of client devices that includes the client device;

applying said transferable pluralities of gradients to the general ML model based on the respective weights for said transferable pluralities of gradients.

13. The one or more non-transitory computer-readable media of claim 12 wherein said calculating the respective weight for the transferable plurality of gradients from the client device comprises decreasing the respective weight when a gradient of the transferable plurality of gradients from the client device exceeds a threshold.

14. The one or more non-transitory computer-readable media of claim 11 wherein the instructions further cause:
applying moments accountant technique, and/or
calculating privacy loss as a random variable based on moment-generating function(s).

15. A system comprising:
a server;
a plurality of client devices connected to the server, wherein each client device is configured to iteratively:
receive, from the server, a plurality of coefficients of a general machine learning (ML) model;
for a respective one or more new data points:
train, based on the one or more new data points, a respective private ML model;
calculate, based on the one or more new data points, a plurality of respective gradients for the plurality of coefficients of the general ML model,
add random noise to the plurality of gradients to generate a plurality of respective noisy gradients,
send the plurality of noisy gradients to the server, and
generate a combined inference based on: the private ML model, the general ML model, and one of the one or more new data points; and
wherein the server is configured to adjust the general ML model based on the pluralities of noisy gradients from the plurality of client devices.

16. The system of claim 15 wherein:
said train the respective private ML model comprises tune, based on a gradient descent, a weighting;
said generate the combined inference comprises:
generate a first inference by apply the respective private ML model to said one of the one or more new data points;
generate a second inference by apply the general ML model to said one of the one or more new data points;
combine the first inference and the second inference based on the weighting.

* * * * *

UNITED STATES PATENT AND TRADEMARK OFFICE
CERTIFICATE OF CORRECTION

PATENT NO. : 11,443,240 B2
APPLICATION NO. : 16/829433
DATED : September 13, 2022
INVENTOR(S) : Peterson et al.

It is certified that error appears in the above-identified patent and that said Letters Patent is hereby corrected as shown below:

On the Title Page

On page 2, Column 2, under item (56) Other Publications, Line 60, delete "Privcy" and insert -- Privacy --, therefor.

On page 2, Column 2, under item (56) Other Publications, Line 67, delete "Modles"," and insert -- Models", --, therefor.

In the Specification

In Column 12, Line 41, delete "$M_{Pi}$," and insert -- $M_{Pi}$ --, therefor.

In Column 12, Line 43, delete "$M_{Pi}$," and insert -- $M_{Pi}$ --, therefor.

In Column 12, Line 53, delete "$\alpha(x)=o$" and insert -- $\alpha(x)=\sigma$ --, therefor.

In Column 12, Line 54, delete "$o(x)$" and insert -- $\sigma(x)$ --, therefor.

In Column 12, Line 60, delete "a" and insert -- $\alpha$ --, therefor.

In Column 20, Line 7, delete "and or" and insert -- and/or --, therefor.

In Column 22, Line 59, in Claim 5, delete "private;" and insert -- private --, therefor.

In Column 23, Line 28, in Claim 8, delete "private;" and insert -- private --, therefor.

In Column 24, Line 7, in Claim 12, delete "private;" and insert -- private --, therefor.

Signed and Sealed this
Twenty-first Day of February, 2023

Katherine Kelly Vidal
*Director of the United States Patent and Trademark Office*